US011993125B2

(12) United States Patent
Cotto

(10) Patent No.: US 11,993,125 B2
(45) Date of Patent: May 28, 2024

(54) ACTIVE SUSPENSION FOR A VEHICLE

(71) Applicant: WAY ASSAUTO SRL, Asti (IT)

(72) Inventor: Fabio Cotto, Turin (IT)

(73) Assignee: WAY ASSAUTO SRL, Asti (IT)

( * ) Notice: Subject to any disclaimer, the term of this patent is extended or adjusted under 35 U.S.C. 154(b) by 0 days.

(21) Appl. No.: 18/002,593

(22) PCT Filed: Jun. 23, 2021

(86) PCT No.: PCT/IB2021/055558
§ 371 (c)(1),
(2) Date: Dec. 20, 2022

(87) PCT Pub. No.: WO2021/260586
PCT Pub. Date: Dec. 30, 2021

(65) Prior Publication Data
US 2023/0226875 A1    Jul. 20, 2023

(30) Foreign Application Priority Data

Jun. 24, 2020    (IT) .................. 102020000015142

(51) Int. Cl.
*B60G 21/073*    (2006.01)
*B60G 11/26*    (2006.01)
(Continued)

(52) U.S. Cl.
CPC .......... *B60G 21/073* (2013.01); *B60G 11/265* (2013.01); *B60G 11/30* (2013.01);
(Continued)

(58) Field of Classification Search
CPC ........ B60G 2202/154; B60G 2202/413; B60G 2202/416; B60G 17/056; B60G 11/265; B60G 11/30; B60G 21/073
(Continued)

(56) References Cited

U.S. PATENT DOCUMENTS 9,702,349 B2 *    7/2017    Anderson ............ B60G 17/052
10,076,943 B2 *    9/2018    Masamura ............ B60G 17/08
(Continued)

FOREIGN PATENT DOCUMENTS

EP    0569429 B1    8/1996
EP    2000336 A1    12/2008
(Continued)

OTHER PUBLICATIONS

International Search Report and Written Opinion for Corresponding International Application No. PCT/IB2021/055558, 19 pages, dated Aug. 31, 2021.

*Primary Examiner* — Amy R Weisberg
*Assistant Examiner* — Caitlin Anne Miller
(74) *Attorney, Agent, or Firm* — Lucas & Mercanti, LLP

(57) ABSTRACT

A vehicle suspension is disclosed having a hydraulic actuator, a cylinder, a piston mounted inside the cylinder dividing the cylinder into a compression chamber and an extension chamber, and a supply hydraulic circuit connected to the actuator to supply the compression chamber and the extension chamber with working fluid. The supply hydraulic circuit includes a high-pressure line connected to a delivery port of a hydraulic pump, a low-pressure line connected to a suction port of the pump, a spool valve connected to the compression and extension chambers of the actuator and to the high-pressure line and to the low-pressure line to put the chambers of the actuator in communication with the lines of the supply hydraulic circuit, and a first pressure accumulator connected to the high-pressure line. The spool valve connects the compression chamber and/or the extension chamber of the actuator with the high-pressure line.

11 Claims, 7 Drawing Sheets

(51) Int. Cl.
*B60G 11/30* (2006.01)
*B60G 17/056* (2006.01)
(52) U.S. Cl.
CPC ...... *B60G 17/056* (2013.01); *B60G 2202/154* (2013.01); *B60G 2202/413* (2013.01); *B60G 2202/416* (2013.01)
(58) Field of Classification Search
USPC ..................................... 280/124.161; 701/37
See application file for complete search history.

(56) References Cited

U.S. PATENT DOCUMENTS

| | | | |
|---|---|---|---|
| 10,183,540 B2 * | 1/2019 | Masamura | B60G 17/056 |
| 2011/0187065 A1 * | 8/2011 | Van Der Knaap | B60G 17/016 |
| | | | 280/5.507 |
| 2018/0022179 A1 * | 1/2018 | Collins | B60G 17/0424 |
| | | | 280/5.5 |
| 2018/0154728 A1 * | 6/2018 | Giovanardi | B60G 13/14 |
| 2018/0281544 A1 | 10/2018 | Masamura | |

FOREIGN PATENT DOCUMENTS

| | | | | |
|---|---|---|---|---|
| EP | 3216632 A1 | 9/2017 | | |
| EP | 3247577 B1 | 3/2020 | | |
| WO | WO-2020214666 A1 * | 10/2020 | | B60G 17/005 |

* cited by examiner

ACTIVE SUSPENSION FOR A VEHICLE

CROSS-REFERENCE TO RELATED APPLICATIONS

This application is a 371 of PCT/IB2021/055558, filed Jun. 23, 2021, which claims the benefit of Italian Patent Application No. 102020000015142, filed Jun. 24, 2020.

TECHNICAL FIELD OF THE INVENTION

The present invention relates in general to the field of vehicle suspensions, in particular motorcar suspensions. More specifically, the present invention relates to an active suspension for a vehicle, as well as to a vehicle comprising such a suspension.

BACKGROUND OF THE INVENTION

It is known the use of suspensions on vehicles in order to improve the driving comfort and handling of the vehicle, filtering the irregularities of the road surface and controlling the relative movement of the sprung masses of the vehicle (including the vehicle body) with respect to the unsprung masses of the vehicle (including the wheels).

It is also known the use of so-called active suspensions on vehicles, which suspensions comprise, for each wheel, an electronically-controlled actuator arranged to control the relative movement of the wheel with respect to the vehicle body under the management of an electronic control unit. The actuator is typically a hydraulic actuator and is supplied with a working fluid under pressure provided by a pump to generate a hydraulic force, with a given intensity and a given direction (extension or compression), to counter the force generated between the wheel and the vehicle body as a result, for example, of irregularities of the road surface or during the acceleration or braking phases of the vehicle.

Active suspensions are known from EP3216632A1 and U.S. Ser. No. 10/076,943B2 and comprise a hydraulic pump, a pressure control valve for modulating the pressure in the high-pressure line downstream of the pump and a flow control valve shiftable between two operating positions to direct the working fluid under pressure to a first or a second chamber of the damper of the suspension to generate a hydraulic force in the direction of the extension movement of the damper or in the direction of the compression movement of the damper. In particular, the flow control valve may also take a third operating position (fail-safe position), in which the first chamber, the second chamber, the high-pressure line and a low-pressure line communicate with each other to make it possible for the suspension to operate in a traditional manner in case of failure of one of the controllers of the flow control valve or of the pressure control valve.

An active suspension for a vehicle having the features specified in the preamble of independent claim 1 is known from US 2018/022179.

According to this known solution, the suspension comprises a hydraulic actuator which is connected at a top end thereof to the vehicle body and at a bottom end thereof to the wheel and is arranged concentrically to, and in parallel with, a cylindrical helical spring. The hydraulic actuator is connected to a supply hydraulic circuit comprising a hydraulic pump, a high-pressure line connected to the delivery port of the pump, a low-pressure line connected to the suction port of the pump, a pressure accumulator connected to the high-pressure line, and a spool valve connected on one side to the compression chamber and to the extension chamber of the hydraulic actuator and on the other side to the high-pressure line and to the low-pressure line. The spool valve is shiftable, starting from a central position, in which the spool of the spool valve closes both the flow paths connected with the hydraulic actuator, that is to say, both the flow path connected with the compression chamber of the hydraulic actuator and the flow path connected with the extension chamber of the hydraulic actuator, in a first direction to take a first intermediate position, in which the spool opens the flow path connected with the extension chamber of the hydraulic actuator, thereby putting that chamber in hydraulic communication with the low-pressure line, while the flow path connected with the compression chamber of the hydraulic actuator remains closed, and a first end position, in which the spool also opens the flow path connected with the compression chamber of the hydraulic actuator, putting the same in hydraulic communication with the high-pressure line and thus causing, as a result of the pressure difference in the chambers of the hydraulic actuator, the extension of the rod of the hydraulic actuator, and in a second direction, opposite to the first one, to take a second intermediate position, in which the spool opens the flow path connected with the compression chamber of the hydraulic actuator, thereby putting that chamber in hydraulic communication with the low-pressure line, while the flow path connected with the extension chamber of the hydraulic actuator remains closed, and a second end position, in which the spool also opens the flow path connected with the extension chamber of the hydraulic actuator, putting the same in hydraulic communication with the high-pressure line and thus causing, as a result of the pressure difference in the chambers of the hydraulic actuator, the retraction of the rod of the hydraulic actuator. The suspension operates in active mode when the spool valve is in the first end position or in the second end position, i.e. when either of the two chambers of the hydraulic actuator is hydraulically connected with the high-pressure line. Only when the spool valve is in the first intermediate position or in the second intermediate position the suspension operates in semi-active mode, since there is no supply of energy to the hydraulic actuator, but the stiffness of the hydraulic actuator is varied as a result of the fluid flowing out of either of the two chambers of the hydraulic actuator towards the low-pressure line. In the central position of the spool valve the fluid is prevented from flowing from the compression chamber or the extension chamber. In case of malfunctioning of the valve control, the suspension cannot therefore operate as a conventional suspension.

SUMMARY OF THE INVENTION

It is an object of the present invention to provide an active suspension for a vehicle that is improved over the above-discussed prior art.

This and other objects are fully achieved by virtue of an active suspension for a vehicle as set forth in the claims.

In short, the invention is based on the idea of providing an active suspension for a vehicle of the above-specified type, wherein the spool valve is configured in such a manner that in each operating position it connects at least one of the two chambers of the hydraulic actuator with the high-pressure line.

Thanks to such a configuration, the active suspension for a vehicle of the present invention allows to adjust in a fast and precise manner the force generated by the hydraulic actuator by suitably controlling the operating position of the spool valve.

Preferably, the supply hydraulic circuit comprises, in addition to a first pressure accumulator connected to the high-pressure line, a second pressure accumulator connected to the low-pressure line.

The first accumulator (high-pressure accumulator) creates a reserve of high-pressure fluid, which allows to reduce the frequency of actuation of the pump and thus make the pressure in the high-pressure line more homogenous and constant. The second accumulator (low-pressure accumulator) creates a reserve of low-pressure fluid, which allows to keep a minimum pressure level in the circuit and ensures taking up of the volume of fluid that is displaced as a result of the movement of the rod of the hydraulic actuator.

The hydraulic pump may be shared by all the hydraulic actuators associated to the wheels of the vehicle or several hydraulic pumps may be provided for, namely either one hydraulic pump for each axle of the vehicle or one hydraulic pump for each wheel. Irrespective of the number of hydraulic pumps, it will be advantageous to provide one first accumulator (high-pressure accumulator) for each hydraulic actuator, i.e. for each wheel of the vehicle.

Preferably, the hydraulic pump (or each hydraulic pump, in case the suspension comprises more than one hydraulic pump) is a fixed-displacement pump.

The pressure in the high-pressure line may be set on a constant value, for example comprised between 30 and 40 bar. Alternatively, the pressure in the high-pressure line may be continuously modulated.

The pressure in the low-pressure line may be for example set on a value comprised between 5 and 10 bar.

Further features of the present invention will become apparent from the following detailed description, given purely by way of non-limiting example.

BRIEF DESCRIPTION OF THE DRAWINGS

In the following detailed description of the invention reference will be made to the attached drawings, wherein.

DETAILED DESCRIPTION OF PREFERRED EMBODIMENTS

Figure 1:
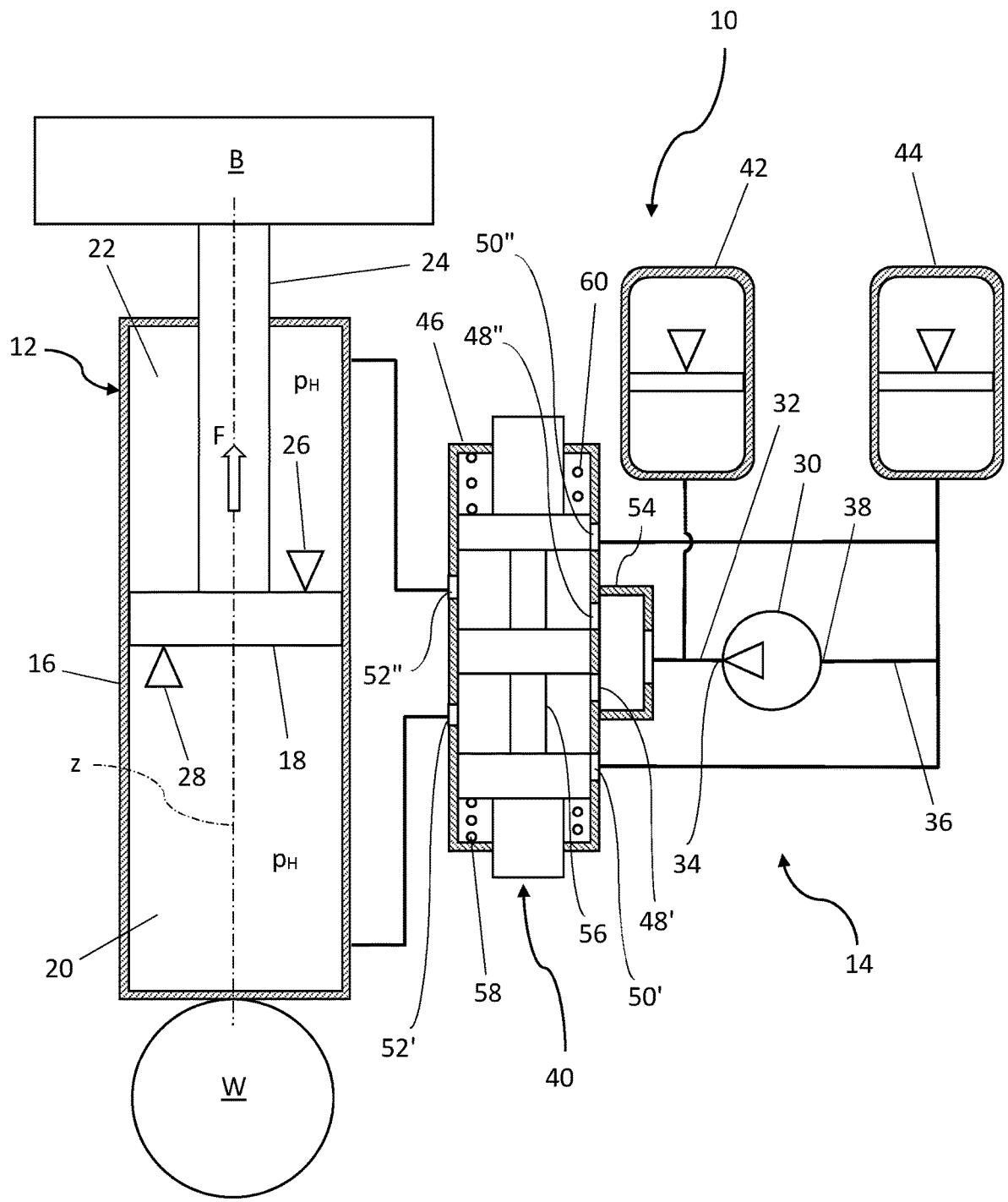
FIG. 1 schematically shows an active suspension for a wheel of a vehicle according to an embodiment of the present invention, with the spool valve of the suspension in the rest position.

With reference first to FIG. 1, an active suspension (hereinafter simply referred to as suspension) for a wheel of a vehicle according to an embodiment of the present invention is generally indicated with 10.

The suspension 10 basically comprises a hydraulic linear actuator 12 (hereinafter simply referred to as actuator), interposed between a wheel W of the vehicle and a body B of the vehicle, and a supply hydraulic circuit 14 connected to the actuator 12.

The actuator 12 comprises a cylinder 16, which is connected to the wheel W and the longitudinal axis (indicated with z) of which is conveniently oriented vertically, and a piston 18 slidably mounted within the cylinder 16 along the longitudinal axis z so as to divide the internal volume of the cylinder 16 into a pair of variable-volume chamber, namely a compression chamber 20 and an extension chamber 22, containing a working fluid (in particular oil). The actuator 12 further comprises a rod 24 which is connected at its bottom end to the piston 18, so as to move as a single piece with the latter, and projects from the cylinder 16, on the same side as the extension chamber 22, to be connected at its top end with the body B of the vehicle. Preferably the piston 18 is provided with pressure limiting valve 26 and 28 (only schematically shown, as they are of per-se-known type) having the function of limiting the force on the piston applied by the pressure of the fluid in the chambers 20 and 22 of the cylinder and avoiding cavitation at high speed.

The supply hydraulic circuit 14 comprises a hydraulic pump 30 (hereinafter simply referred to as pump), a high-pressure line 32 (whose pressure will be hereinafter indicated with $p_H$) connected to a delivery port 34 of the pump 30, a low-pressure line 36 (whose pressure will be hereinafter indicated with $p_L$) connected to a suction port 38 of the pump 30, and a spool valve 40 connected on one side to the compression chamber 20 and to the extension chamber 22 of the actuator 12 and on the other side to the high-pressure line 32 and to the low-pressure line 36 to put in fluid communication, according to predetermined operating modes (which will be illustrated below), the two chambers 20 and 22 of the actuator 12 with the two lines 32 and 36 of the supply hydraulic circuit 14. The supply hydraulic circuit 14 further comprises a first pressure accumulator 42 connected to the high-pressure line 32 and a second pressure accumulator 44 connected to the low-pressure line 36.

The pump 30 is preferably a fixed-displacement pump. As will be explained further below, only one pump may be provided for in a vehicle, which pump is configured to supply all the actuators of the vehicle (one for each wheel), or several pumps may be provided for, in particular either one pump for the actuators of the front axle of the vehicle and one pump for the actuators of the rear axle of the vehicle or one pump for each actuator.

The pressure $p_H$ in the high-pressure line 32 may be constant or, alternatively, be modulated continuously. The pressure $p_H$ is for example comprised between 30 and 40 bar. On the other hand, the pressure $p_L$ in the low-pressure line 36 is comprised for example between 5 and 10 bar.

The spool valve 40 comprises a valve body 46 having one or more first inlet openings (in the present case two inlet openings 48' and 48"), which are connected each with the high-pressure line 32 and are also in fluid communication with each other, one or more second inlet openings (in the present case two inlet openings 50' and 50") connected with the low-pressure line 36, a first outlet opening 52' connected with the compression chamber 20 of the actuator 12 and a second outlet opening 52" connected with the extension chamber 22 of the actuator 12. More specifically, the inlet openings 48' and 48" are in fluid communication with a manifold 54, which is in turn in communication with the high-pressure line 32. The fluid coming from the compression chamber 20 can thus flow towards the extension chamber 22, and vice versa, passing through the inlet openings 48' and 48" and the manifold 54. The spool valve 40 further comprises a spool 56 slidably mounted inside the valve body 46 to control the flow of the working fluid from the inlet openings 48', 48", 50' and 50" to the outlet openings 52' and 52". With reference now to FIGS. 2 to 5 as well, the various positions of the spool 56 of the spool valve 40 and, along with the same, the operation of the suspension 10, will be described.

Figure 5:
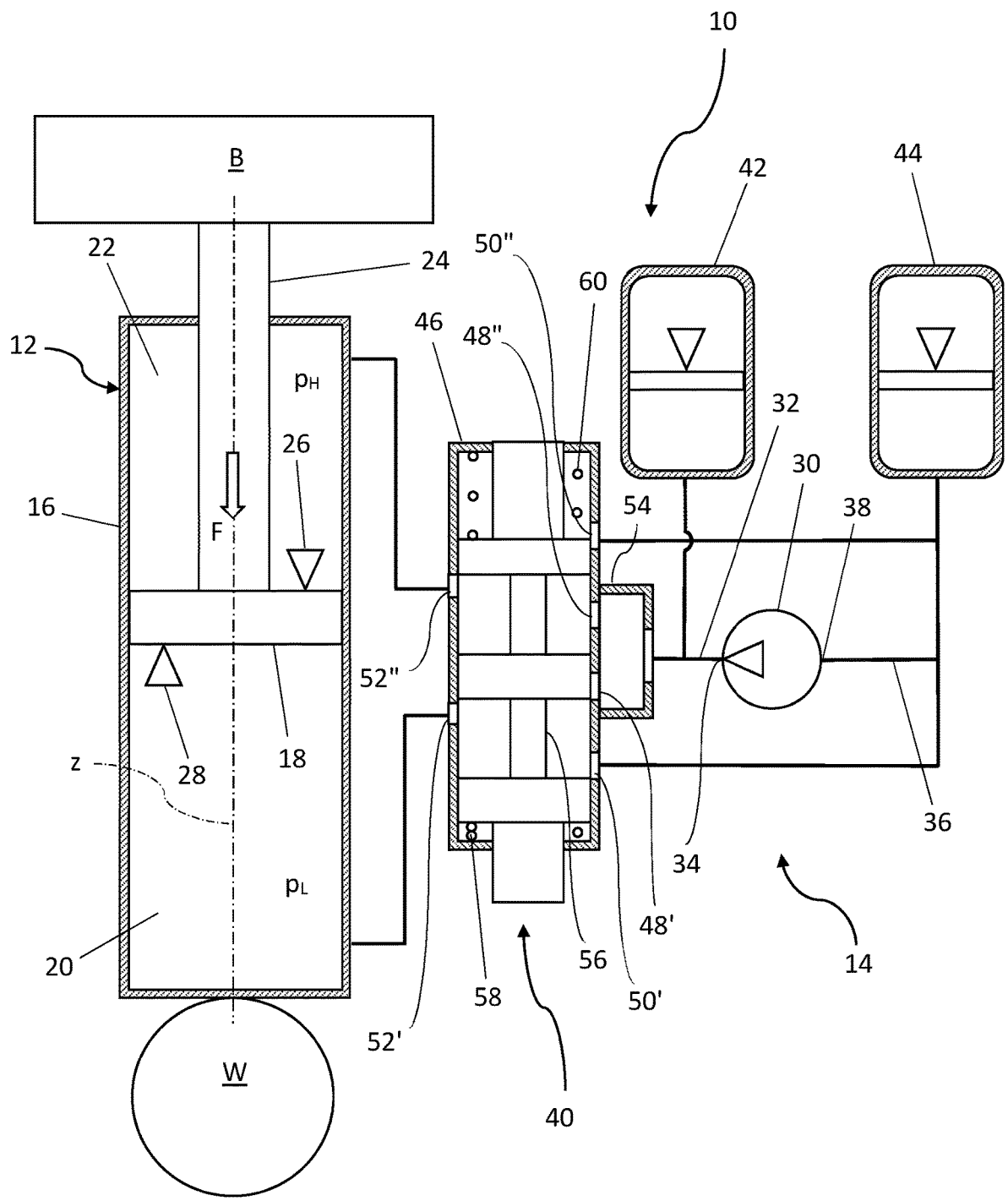
FIG. 5 schematically shows the active suspension of FIG. 1, with the spool valve of the suspension in a second end position.

The spool 56 of the spool valve 40 is normally kept, for example by means of springs 58 and 60 placed at opposite sides of the spool, in a rest position (FIG. 1), and is movable, starting from this rest position, in a first direction, against the action of the spring 58, to reach a first end position (shown in FIG. 3), or in a second direction opposite to the first one, against the action of the spring 60, to reach a second end position (shown in FIG. 5). In this regard, in the proposed embodiment the spool valve 40 is configured in such a manner that in all the positions of the spool 56 the outlet openings 52' and 52" are always fully open, while the opening degree of the inlet openings 48', 48", 50' and 50" varies depending on the position of the spool 56.

The movement of the spool 56 is preferably driven continuously, thereby allowing to precisely adjust the opening degree of the inlet openings 48', 48", 50' and 50"46, and hence the pressure of the fluid in the chambers 20 and 22 of the actuator 12. To this end, the spool valve 40 further comprises, in a per-se-known manner, one or two solenoids or similar control means (not shown) operatively associated to the spool 56 to cause the latter to move in one direction or the other in any position between the first end position and the second end position.

As shown in FIG. 1, in the rest position the spool 56 is arranged in such a manner as to leave both the first inlet openings 48' and 48" fully open, so that both the compression chamber 20 and the extension chamber 22 of the actuator 12 are connected with the high-pressure line 32, through the first inlet opening 48' and the first outlet opening 52' and through the first inlet opening 48" and the second outlet opening 52", respectively, and are therefore both at the same pressure $p_H$ (high pressure). A force F directed upwards is thus applied onto the piston 18 of the actuator 12 due to the difference between the areas on which the pressure of the fluid in the chambers 20 and 22 acts. Furthermore, as the first inlet openings 48' 48" are in fluid communication with each other through the manifold 54, the fluid can flow from the extension chamber 22 to the extension chamber 20 passing in the order through the second outlet opening 52", the first inlet opening 48", the first inlet opening 48' and the first outlet opening 52', and vice versa. When the spool 56 is in the rest position, the hydraulic actuator 12 operates as a conventional damper by virtue of the fluid connection between the two chambers 20 and 22 through the manifold 54.

Figure 2:
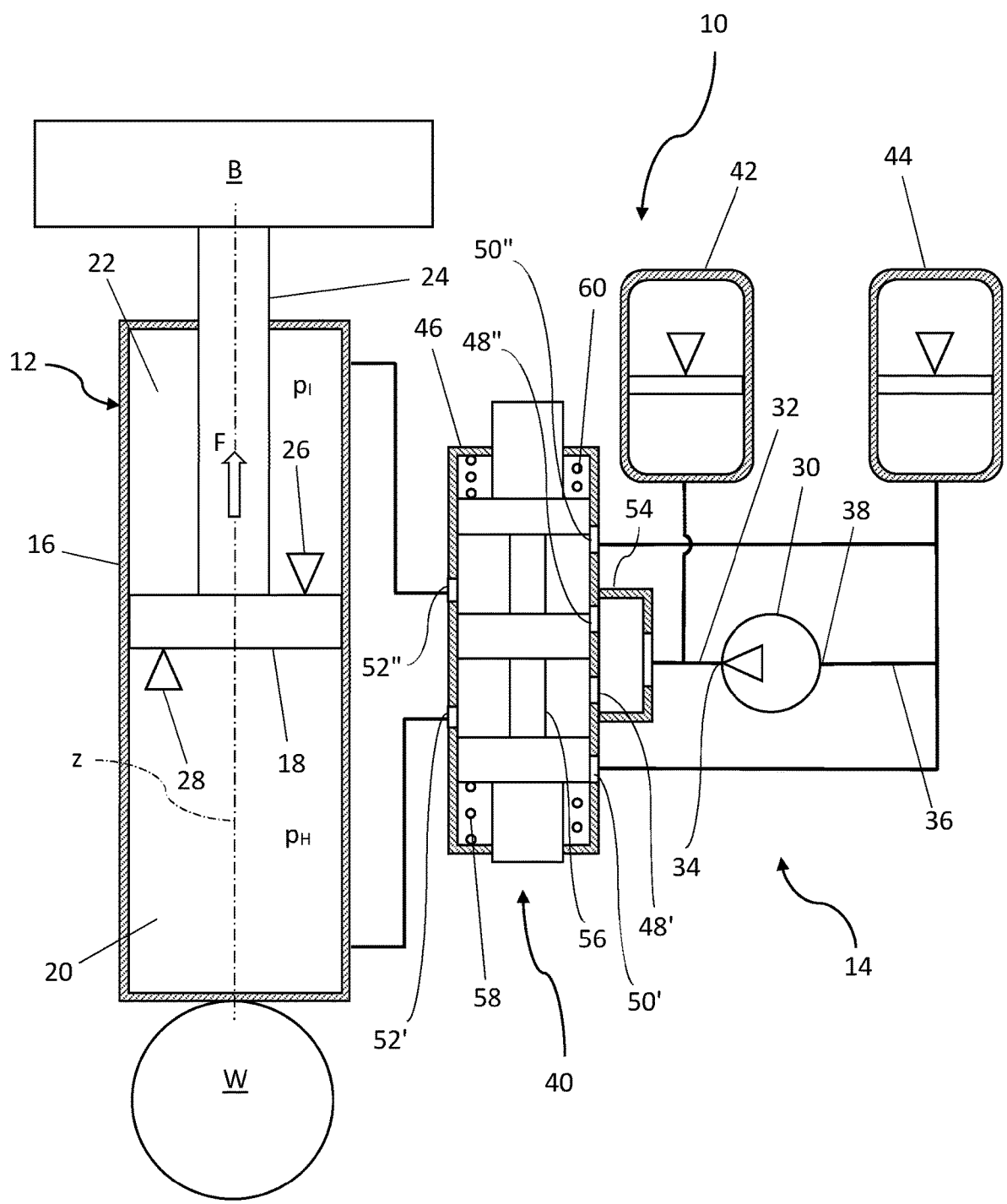
FIG. 2 schematically shows the active suspension of FIG. 1, with the spool valve of the suspension in a first intermediate position.

If, starting from the rest position, the spool 56 is moved towards the first end position (upwards, with respect to the point of view of a person looking at FIG. 1), as shown in FIG. 2, the first inlet opening 48", which in the rest position was fully open, is now partially closed, while the second inlet opening 50", which in the rest position was fully closed, is now partially open. Accordingly, while the compression chamber 20 of the actuator 12 is in fluid communication with the high-pressure line 32 only, through the first inlet opening 48' and the first outlet opening 52', the extension chamber 22 is in fluid communication both with the high-pressure line 32, through the first inlet opening 48" and the second outlet opening 52", and with the low-pressure line 36, through the second inlet opening 50" and the second outlet opening 52". Therefore, while the pressure in the compression chamber 20 of the actuator 12 continues to be equal to the pressure $p_H$ of the high-pressure line 32, the pressure in the extension chamber 22 will be equal to an intermediate value $p_I$ between the value $p_H$ of the high-pressure line 32 and the value $p_L$ of the low-pressure line 36. This intermediate pressure value $p_I$ can be modulated by suitably varying the position of the spool 56, and will be the lower the further the spool 56 moves away from the rest position, i.e. the higher is the opening degree of the second inlet opening 50" which allows to connect the extension chamber 22 of the actuator 12 with the low-pressure line 36. With the pressure in the compression chamber 20 of the actuator 12 being constant, if the pressure in the extension chamber 22 is reduced then the intensity of the upward force F acting on the piston 18, and hence of the extension force the actuator 12 applies between the wheel W and the body B of the vehicle is increased.

Figure 3:
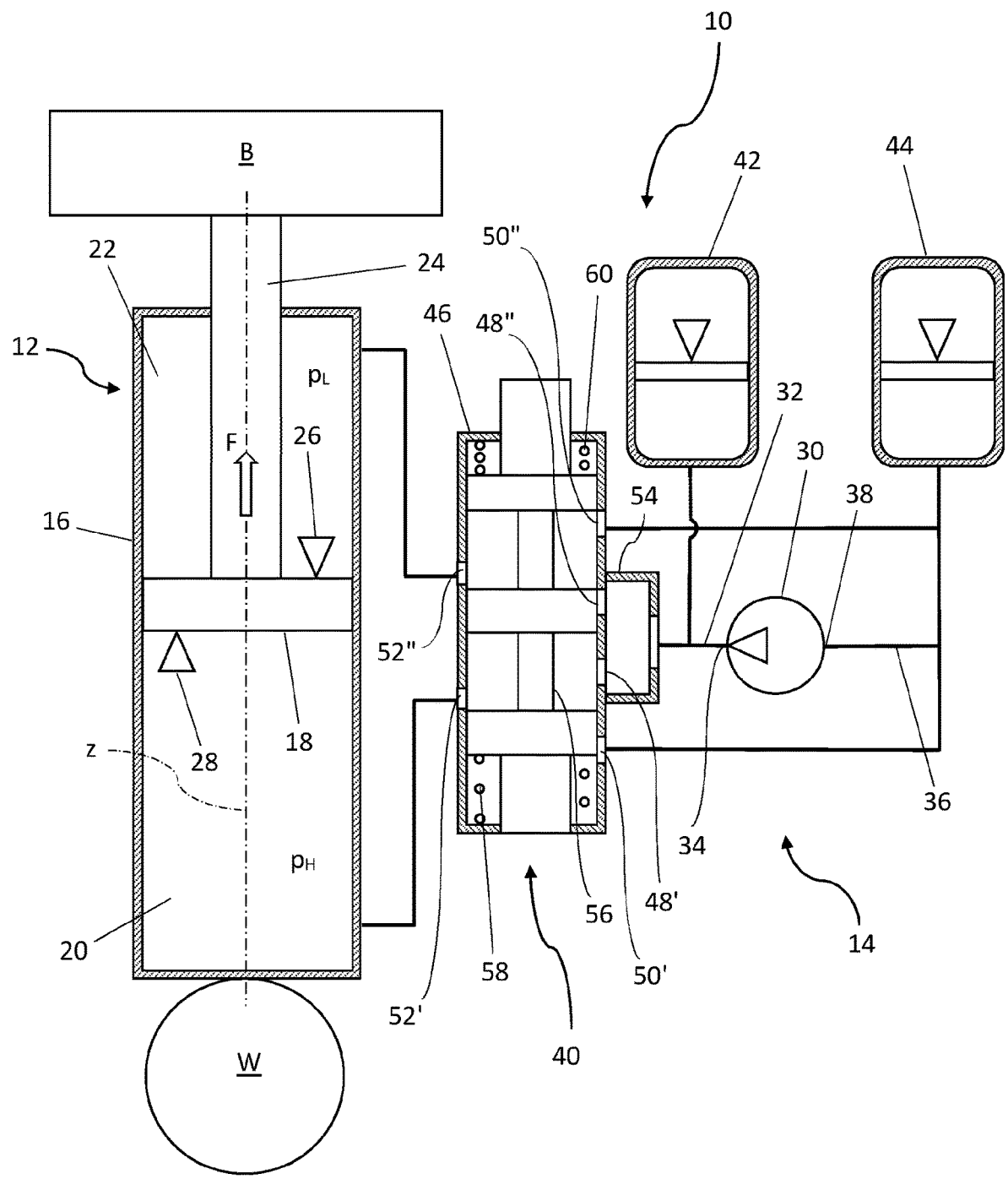
FIG. 3 schematically shows the active suspension of FIG. 1, with the spool valve of the suspension in a first end position.

With the spool 56 in the first end position, as shown in FIG. 3, the first inlet opening 48" is fully closed, while the second inlet opening 50" is fully open. Accordingly, while the compression chamber 20 of the actuator 12 is in fluid communication with the high-pressure line 32 only, through the first inlet opening 48' and the first outlet opening 52', the extension chamber 22 is in fluid communication with the low-pressure line 36 only, through the second inlet opening 50" and the second outlet opening 52". Therefore, while the pressure in the compression chamber 20 of the actuator 12 continues to be equal to the pressure $p_H$ of the high-pressure line 32, the pressure in the extension chamber 22 will now be equal to the pressure $p_L$ of the low-pressure line 36. This position of the spool 56 corresponds therefore to the maximum pressure difference in the two chambers 20 and 22 of the actuator 12, and hence to the maximum intensity of the extension force F the actuator 12 applies between the wheel W and the body B of the vehicle.

Figure 4:
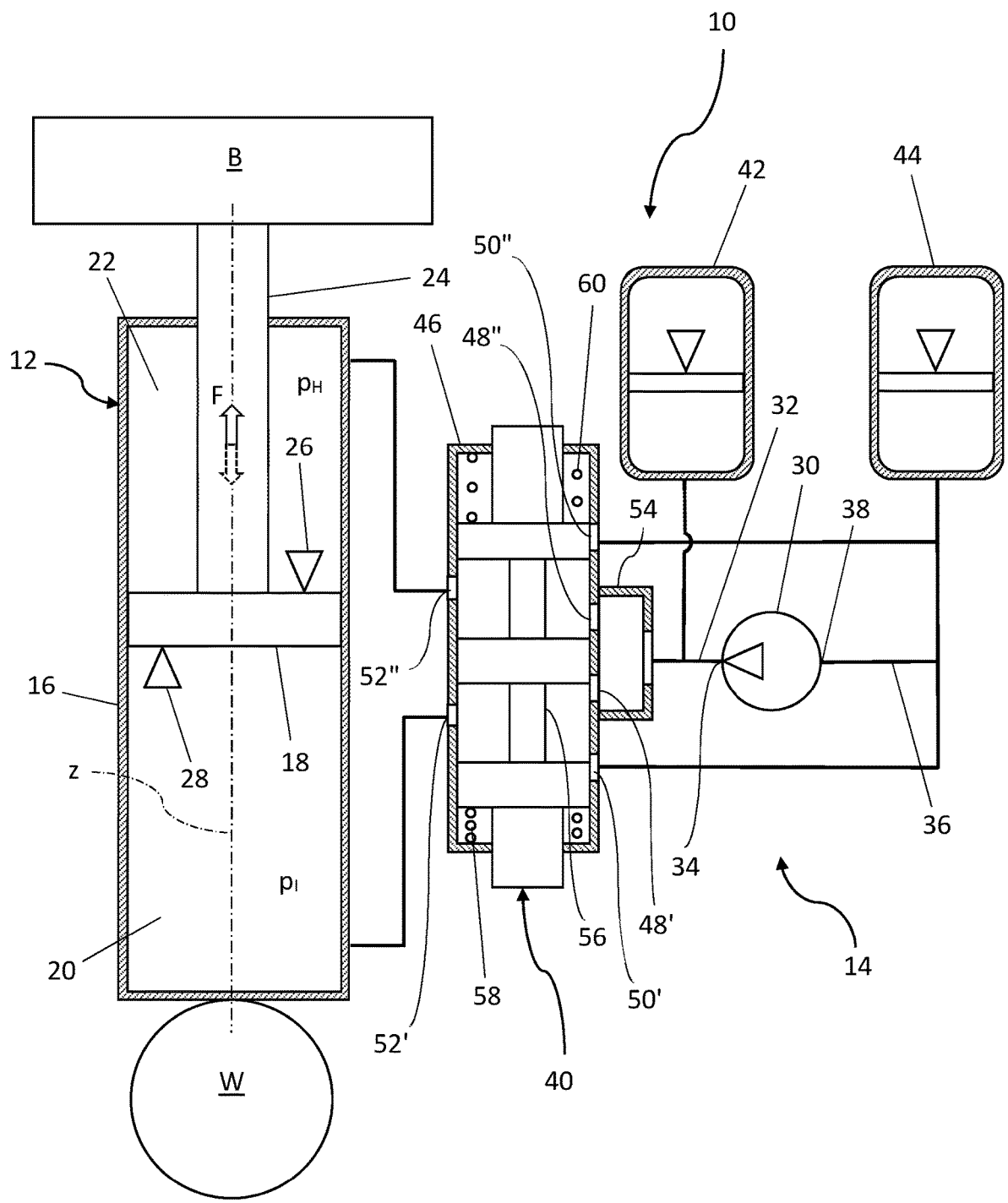
FIG. 4 schematically shows the active suspension of FIG. 1, with the spool valve of the suspension in a second intermediate position.

With reference now to FIG. 4, if, starting from the rest position, the spool 56 is moved towards the second end position (downwards, with respect to the point of view of a person looking at of the FIG. 1), the first inlet opening 48', which in the rest position was fully open, is now partially closed, whereas the second inlet opening 50', which in the rest position was fully closed, is now partially open. Accordingly, while the extension chamber 22 of the actuator 12 is in fluid communication with the high-pressure line 32 only, through the first inlet opening 48" and the second outlet opening 52", the compression chamber 20 is in fluid communication both with the high-pressure line 32, through the first inlet opening 48' and the first outlet opening 52', and with the low-pressure line 36, through the second inlet opening 50' and the first outlet opening 52'. Therefore, while the pressure in the extension chamber 22 of the actuator 12 continues to be equal to the pressure $p_H$ of the high-pressure line 32, the pressure in the compression chamber 20 will be equal to an intermediate value $p_I$ between the value $p_H$ of the high-pressure line 32 and the value $p_L$ of the low-pressure line 36. This intermediate pressure value can be modulated by suitably varying the position of the spool 56, and will be the lower the further the spool 56 moves away from the rest position, i.e. the higher is the opening degree of the second inlet opening 50' which allows to connect the compression chamber 20 of the actuator 12 with the low-pressure line 36. If, in the rest position of the spool 56, the resulting force on the piston 18 is directed upwards, the lower the pressure in the compression chamber 20 the lower the intensity of the resulting force, until the resulting force becomes null, then changes direction and is thus directed downwards, with increasing intensity.

Finally, with the spool 56 in the second end position, as shown in FIG. 5, the first inlet opening 48' is fully closed, whereas the second inlet opening 50' is fully open. Accordingly, while the extension chamber 22 of the actuator 12 continues to be in fluid communication with the high-pressure line 32 only, through the first inlet opening 48" and the second outlet opening 52", the compression chamber 20 is in fluid communication with the low-pressure line 36 only, through the second inlet opening 50' and the first outlet opening 52'. Therefore, while the pressure in the extension chamber 22 of the actuator 12 continues to be equal to the pressure $p_H$ of the high-pressure line 32, the pressure in the compression chamber 20 will now be equal to the pressure $p_L$ of the low-pressure line 36. This position of the spool 56 corresponds therefore to the maximum pressure difference in the two chambers 20 and 22 of the actuator 12, and hence to the maximum intensity of the force F (which in this case is a compression force) the actuator 12 applies between the wheel W and the body B of the vehicle.

The force F applied by the actuator 12 can therefore be adjusted, both in terms of direction and in terms of intensity, by suitably controlling the spool valve 40. To this end, an electronic control unit is configured to send suitable control signals to the solenoid (or solenoids) of the spool valve 40 so as to position each time the spool 56 in the position corresponding to the desired force F of the actuator 12.

Figure 6:
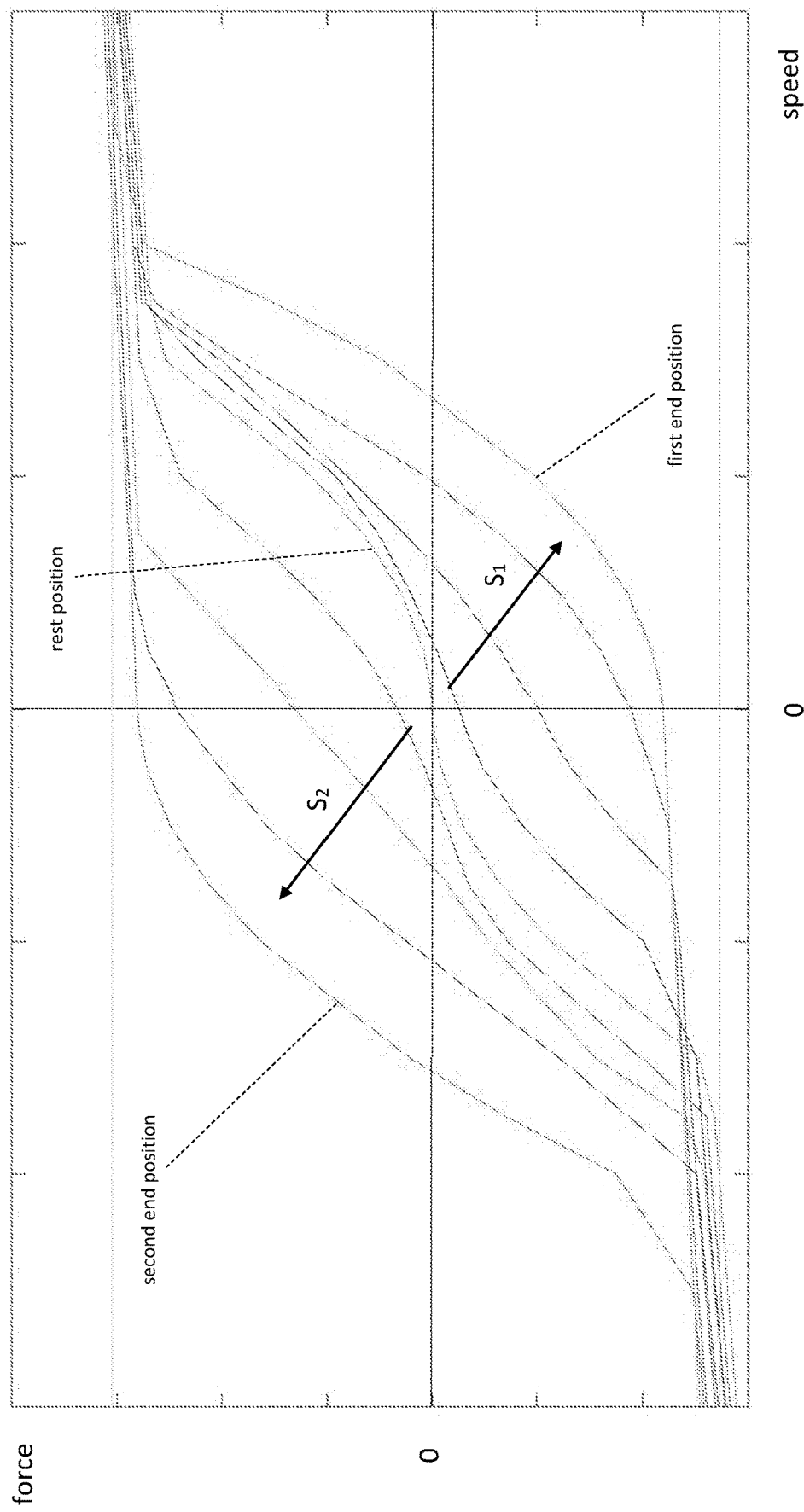
FIG. 6 is a graph showing an example of the force-speed characteristic curve of an active suspension according to the present invention.

In this connection, FIG. 6 shows an example of force-speed characteristic curve obtainable with an active suspension according to the present invention, in which the various curves shown correspond each to a respective position of the spool 56 of the spool valve 40. In particular, there are shown the curve corresponding to the condition in which the spool 56 is in the rest position, the curve corresponding to the condition in which the spool 56 is in the first end position and the curve corresponding to the condition in which the spool 56 is in the second end position, in addition to a series of other curves corresponding to intermediate positions of the spool 56 between the rest position and the first end position (arrow $S_1$ indicates in this regard positions of the spool closer and closer to the first end position) and to intermediate positions of the spool 56 between the rest position and the second end position (arrow $S_2$ indicates in this regard positions of the spool closer and closer to the second end position).

Figure 7:
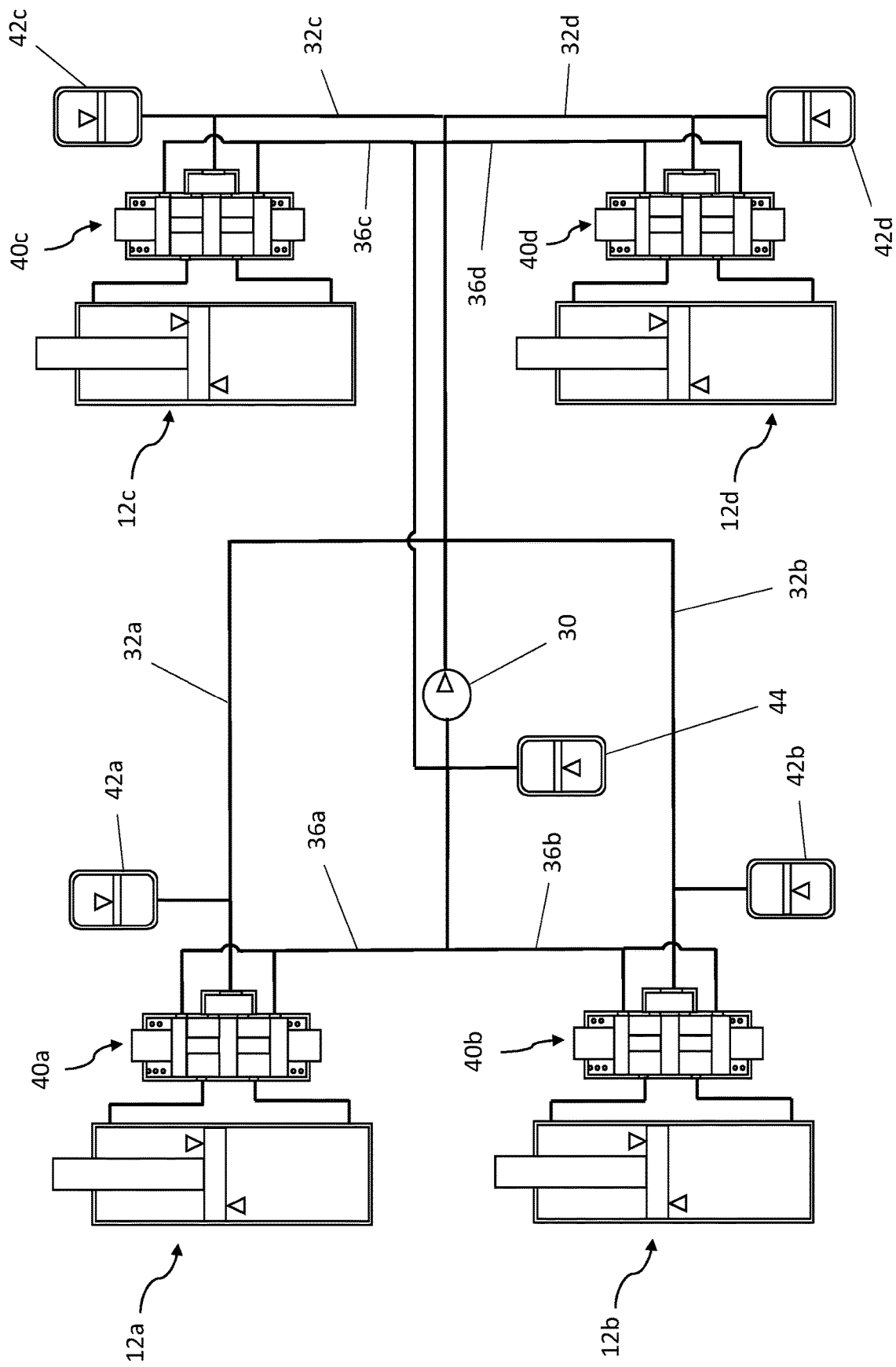
FIG. 7 schematically shows the architecture of an active suspension for a vehicle according to an embodiment of the present invention.

Applied to a four-wheel vehicle, as shown in the schematic view of FIG. 7, the active suspension according to the present invention will comprise, for each wheel, a respective actuator 12a, 12b, 12c, 12d and a respective spool valve 40a, 40b, 40c, 40d arranged to control the force applied by this actuator between the wheel of the vehicle associated thereto and the vehicle body. Each actuator 12a, 12b, 12c, 12d is supplied by a respective high-pressure line 32a, 32b, 32c, 32d and a respective low-pressure line 36a, 36b, 36c, 36d. A respective first pressure accumulator 42a, 42b, 42c, 42d is connected to each high-pressure line 32a, 32b, 32c, 32d. On the other hand, as far as the low-pressure lines 36a, 36b, 36c, 36d are concerned, in the present example they are all connected to a same second pressure accumulator 44. Moreover, in the present example a single pump 30 is provided for, which is arranged to supply fluid under pressure to all the high-pressure lines 32a, 32b, 32c, 32d, hence to all the actuators 12a, 12b, 12c, 12d. Alternatively, two pumps might be provided for, each arranged to supply fluid under pressure to the two actuators associated to the wheels of a respective axle (front or rear axle) of the vehicle, or also four pumps, each arranged to supply fluid under pressure to the actuator associated to a respective wheel of the vehicle.

In view of the above description, the advantages provided by an active suspension for a vehicle according to the present invention are evident.

The suspension allow to control in a fast and precise manner the actuation force generated by the actuator, by virtue of the fact that the spool valve carries out not only the function of controlling the direction of the flows, but also the function of pressure modulation, by adjusting the difference between the pressures in the two chambers of the actuator. Furthermore, the adjustment of the force thus obtained is not influenced by the inertia of the pump or of the motor that drives the pump.

Additionally, in case of malfunctioning of the control of the spool valve, the spool takes the rest position in which it puts the compression chamber and the extension chamber of the hydraulic actuator in communication with each other, thereby allowing the latter to operate as a conventional damper.

The pressure accumulator connected to the high-pressure line serves to create a reserve of high-pressure fluid to reduce the frequency of actuation of the pump, to make the pressure in the high-pressure line more homogenous and more constant and to make the actuation faster.

The pressure accumulator connected to the low-pressure line serves to create a reserve of fluid to keep a minimum pressure level and allow to take up the volume of oil displaced as a result of the movement of the rod of the actuator.

The pressure accumulator connected to the low-pressure line may also be used to cool the oil. In this case, the pressure accumulator will be provided with fins or other known measures to perform that function.

The pressure limiting valve advantageously provided on the piston of the actuator serve to limit the force on the piston and allow to avoid cavitation at high speeds.

The present invention has been herein disclosed with reference to a preferred embodiment thereof. It is to be intended that other embodiments may be envisaged, which share with the one described above the same inventive concept, as defined by the scope of the following claims.

The invention claimed is:

1. An active suspension for a vehicle, with
  a hydraulic actuator intended to be arranged between a respective wheel of the vehicle and a body of the vehicle and comprising a cylinder, a piston slidably mounted inside the cylinder to divide an internal volume of the cylinder into a pair of variable-volume chambers, namely a compression chamber and an extension chamber, both containing a working fluid, and a rod rigidly connected to the piston and projecting from the cylinder on the same side as the extension chamber, and
  a supply hydraulic circuit connected to the hydraulic actuator to supply the compression chamber and the extension chamber with the working fluid,
wherein the supply hydraulic circuit comprises a hydraulic pump, a high-pressure line connected to a delivery port of the hydraulic pump, a low-pressure line connected to a suction port of the hydraulic pump, a spool valve connected on one side to the compression chamber and to the extension chamber of the hydraulic actuator and on the other side to the high-pressure line and to the low-pressure line to put said compression chamber and extension chambers of the hydraulic actuator in fluid communication with said high-pressure line and low-pressure line of the supply hydraulic circuit, and a first pressure accumulator connected to the high-pressure line, and wherein the spool valve comprises a spool which is continuously movable between a plurality of operating positions comprised, in a first direction, between a rest position and a first end position and, in a second direction opposite to the first direction, between said rest position and a second end position, wherein the spool valve is configured to connect, in each operating position of the spool, at least one of the compression chamber and the extension chamber of the hydraulic actuator with the high-pressure line, the spool valve also being configured so that in said rest position of the spool, the compression chamber and the extension chamber of the hydraulic actuator are both connected with the high-pressure line only, as well as, through the spool valve, with each other, in said first end position of the spool the compression chamber is connected with the high-pressure line only, while the extension chamber is connected with the low-pressure line only, in each intermediate position of the spool between said rest position and said first end position the compression chamber is connected with the high-pressure line only, while the extension chamber is connected both with the high-pressure line and with the low-pressure line, in said second end position of the spool the extension chamber is connected with the high-pressure line only, while the compression chamber is connected with the low-pressure line only, and in each intermediate position of the spool between said rest position and said second end position the extension chamber is connected with the high-pressure line only, while the compression chamber is connected both with the high-pressure line and with the low-pressure line, and wherein the spool valve comprises two first inlet openings, which are connected each with the high-pressure line and are also in fluid communication with each other, two second inlet openings, each respectively connected with the low-pressure line, a first outlet opening connected with the compression chamber of the hydraulic actuator, and a second outlet opening connected with the extension chamber of the hydraulic actuator, and wherein the spool valve is configured that in each intermediate position of the spool between said rest position and said first end position the compression chamber of the hydraulic actuator is in fluid communication with the high-pressure line only, through one of said first inlet openings and said first outlet opening, and the extension chamber of the hydraulic actuator is in fluid communication both with the high-pressure line, through one of said first inlet openings and said second outlet opening, and with the low-pressure line, through one of said second inlet openings and said second outlet opening, and so that in each intermediate position of the spool between said rest position and said second end position the extension chamber of the hydraulic actuator is in fluid communication with the high-pressure line only, through one of said first inlet openings and said second outlet opening, and the compression chamber of the hydraulic actuator is in fluid communication both with the high-pressure line, through one of said first inlet openings and said first outlet opening, and with the low-pressure line, through one of said second inlet openings and said first outlet opening.

2. The suspension of claim 1, further comprising a manifold associated with the spool valve to be in fluid communication on one side with said first inlet openings and on the other side with the high-pressure line.

3. The suspension of claim 1, wherein the supply hydraulic circuit comprises a second pressure accumulator connected to the low-pressure line.

4. The suspension of claim 1, wherein the piston of the hydraulic actuator includes a pair of pressure limiting valves arranged to limit the pressure of the working fluid both in the compression chamber and in the extension chamber of the hydraulic actuator.

5. The suspension of claim 1, wherein a pressure in the high-pressure line is set to a constant value or is modulated continuously.

6. The suspension of claim 1, wherein the hydraulic pump is a fixed-displacement pump.

7. A vehicle comprising a body, a plurality of wheels and, for each wheel, a suspension according to claim 1.

8. The vehicle of claim 7, wherein the supply hydraulic circuit comprises a single hydraulic pump for supplying all the hydraulic actuators through respective high-pressure lines.

9. The vehicle of claim 7, wherein the supply hydraulic circuit comprises a first hydraulic pump for supplying all the hydraulic actuators associated to the wheels of a first axle of the vehicle through respective high-pressure lines, and a second hydraulic pump for supplying all the hydraulic actuators associated to the wheels of a second axle of the vehicle through respective high-pressure lines.

10. The vehicle of claim 7, wherein the supply hydraulic circuit comprises, for each hydraulic actuator, a respective hydraulic pump for supplying the hydraulic actuator through a respective high-pressure line.

11. The suspension of claim 5, wherein the pressure in the high-pressure line is set to a value between 30 and 40 bar.

* * * * *